United States Patent [19]

Sakakima et al.

[11] Patent Number: 4,590,530
[45] Date of Patent: May 20, 1986

[54] MAGNETIC HEAD

[75] Inventors: Hiroshi Sakakima; Mitsuo Satomi, both of Hiràkata; Yukihiro Yanagiuchi, Katano; Harufumi Senno, Yamatokooriyama, all of Japan

[73] Assignee: Matsushita Electric Industrial Co., Ltd., Kadoma, Japan

[21] Appl. No.: 444,455

[22] Filed: Nov. 24, 1982

[30] Foreign Application Priority Data

Nov. 24, 1981 [JP] Japan .................................. 56-188672

[51] Int. Cl.⁴ .......................... G11B 5/221; G11B 5/14
[52] U.S. Cl. .................................... 360/122; 360/126; 360/127
[58] Field of Search .......................... 360/122, 125–127

[56] References Cited
PUBLICATIONS

Frost et al., "Fabrication . . . Head", IBM Tech. Disc. Bull., vol. 7, No. 11, Apr. 1965, p. 993.

Primary Examiner—Robert S. Tupper
Attorney, Agent, or Firm—Wenderoth, Lind & Ponack

[57] ABSTRACT

A magnetic head a core having a front core and a back core. The front core has a wear-resistant non-magnetic base and a soft magnetic thin film disposed on the base. The thin film is divided into halves by a magnetic gap therein. The back core has a U-shaped block of soft magnetic material and a wear-resistant non-magnetic member connected between the legs of the soft magnetic block. The front and back cores are coupled with each other with the thin film sandwiched therebetween, the magnetic gap in the thin film facing the wear-resistant non-magnetic member, and the soft magnetic thin film and the soft magnetic block being in face-to-face contact with each other out of the neighborhood of the magnetic gap to form a closed magnetic path across the magnetic gap.

9 Claims, 5 Drawing Figures

MAGNETIC HEAD

BACKGROUND OF THE INVENTION

This invention relates to a magnetic head and more particularly to an improved magnetic core construction.

Generally, amorphous alloys, sendust, ferrite and so forth are used as core material for magnetic heads. Materials which have both excellent wear resistance and magnetic characteristics have not been available so far. Ferrite has remarkable wear resistance but low saturation magnetic flux density. Sendust exhibits excellent magnetic characteristics but has the drawbacks that its workability especially in shaping into a thin film is poor and its wear resistance is only a fraction of that of ferrite. Recently, amorphous alloys have been considered as an attractive material which is satisfactory not only in magnetic characteristics but also in wear characteristics. Although they are easy to manufacture in the form of a thin film, amorphous alloys which have wear resistance superior to ferrite have not been available so far. Thus they have not been applied for use in VTR heads which require an extreamly high wear resistance.

SUMMARY OF THE INVENTION

It is an object of the present invention to provide a magnetic head which not only has excellent electromagnetic characteristics, i.e. magnetic conversion characteristics, but also has excellent wear characteristics and furthermore is adaptable for mass production.

To achieve the foregoing object, a core in a magnetic head embodying the present invention comprises a front core having a wear-resistant non-magnetic base and a thin film of soft magnetic material disposed on the base and divided into two halves with a magnetic gap therein, and a back core having a fork-shaped block of soft magnetic material forming a back magnetic path and a wear-resistant non-magnetic member mounted on a forked tip portion of the block.

The front and back cores are so coupled with each other that the thin film of soft magnetic material is sandwiched and the magnetic gap in the soft magnetic thin film faces against the wear-resistant non-magnetic member at the tip portion of the back core. The soft magnetic thin film and the soft magnetic block establish a closed magnetic path via the magnetic gap by keeping face-to-face contact with each other out of the neighborhood of the gap.

DESCRIPTION OF THE PREFERRED EMBODIMENT

Figure 1A:
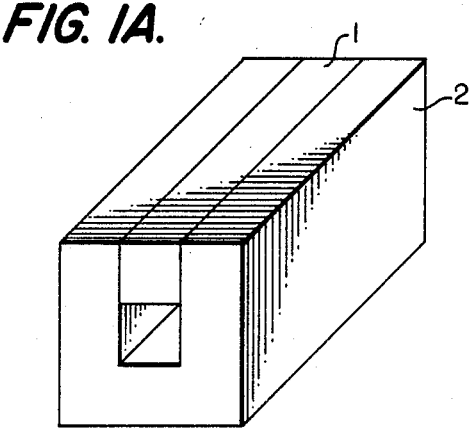
FIGS. 1 to 3 are perspective views showing the steps of manufacturing a magnetic head according to an embodiment of the present invention.
Figure 1B:
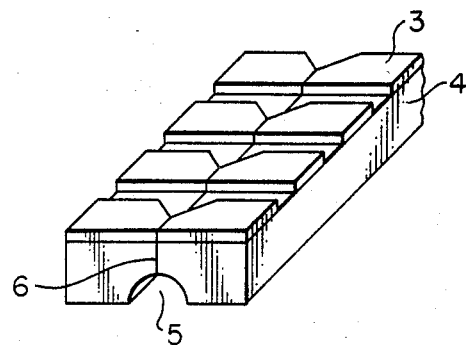
Figure 2:
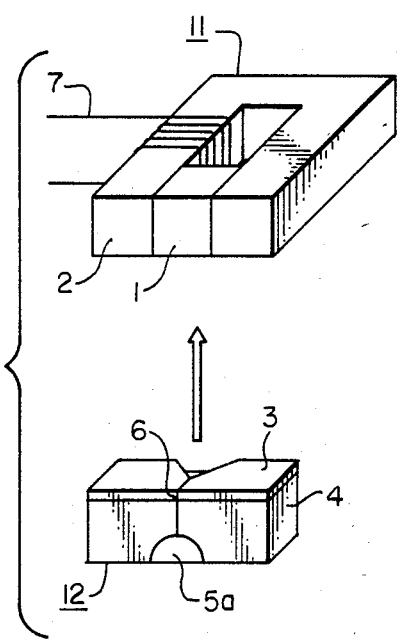

Referring now to FIG. 1A, there is illustrated a non-magnetic ceramic material 1 having good wear characteristics and secured in U-shape cross section ferrite core 2 as an integral unit by means of an adhesive. By slicing the ceramic material into pieces of a proper thickness, U-shaped back cores 11 of a magnetic head having a non-magnetic wear resistant material connected between the ends of the legs thereof, as illustrated in FIG. 2, are provided. In FIG. 1B, there is shown thin films 3 of soft magnetic material with a thickness equal to the width of a track deposited in a desired pattern on a non-magnetic ceramic substrate 4 having high abrasion resistance, by sputtering using a mask pattern. The substrate 4 is previously provided with a groove 5 for holding an adhesive. After the substrate is cut in the place where magnetic gaps 6 are to be defined, $SiO_2$ or the like is sputtered in order to set up the magnetic gaps at the cutting plane. As seen in FIG. 1B, the respective pieces of the substrate are butted against each other and bonded together by means of glass or an adhesive 5a injected into the groove 5. The "gapped bar" so manufactured is sliced into respective front cores 12 as shown in FIG. 2. The adhesive is designated by 5a in FIG. 2.

Figure 3:
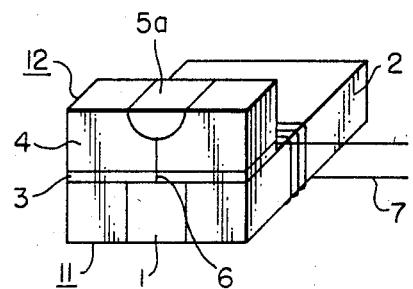

The resulting back core 11 carrying a winding 7 is affixed by means of an adhesive to the front core 12 with the soft magnetic alloy films 3 therebetween as shown in FIG. 2, with the result being illustrated in FIG. 3. The surfaces of the ceramic material 1 and the ferrite core 2 to which the back core is affixed are mirror finished.

In the finished structure, the magnetic gap 6 in the soft magnetic alloy 3 faces against the nonmagnetic ceramic material 1 of the back core 11 and the thin-film soft magnetic alloy 3 at a given distance from the magnetic gap faces against the ferrite core 2. A magnetic circuit is set up through the soft magnetic alloy 3 and the ferrite 2. The front surface of the magnetic head (the surface at the front of FIG. 3) is finished into a curved surface suited for the tape to slide thereon, to complete the manufacturing of the magnetic head.

The resulting magnetic head has significant advantages as follows:

(1) It is possible to provide excellent magnetic characteristics compatible with metal tapes by the use of the thin-film soft magnetic alloy which has high density of saturated magnetic flux and manifests remarkable magnetic characteristics at high frequencies. The wear resistance of the magnetic head is equal to or higher than that of ferrite since its tape sliding surface is mostly the wear resistant ceramic material 1 and 4.

(2) While in the past it was difficult to provide glass bonding at a magnetic gap in a metallic material, the problem in setting up the magnetic gap is overcome by sputtering the soft magnetic alloy onto the ceramic material into a single unit and effecting glass bonding with the ceramic material. Furthermore, the manufacturing of the gapped bar does not require as many steps as does the prior art device, since the depth of the gap is defined as shown in FIG. 1B at the time of the mask sputtering.

(3) The ferrite used in the back core need not necessarily be single crystal as required for VTR use at present but may be sintered ferrite instead. This flexibility of choice ensures simplicity of working and cost savings in the manufacture of the magnetic head.

(4) The magnetic head is easy to mass produce even by sputtering since a thin-film soft magnetic alloy of up to approximately 2 mm×2 mm is enough in the front core.

Figure 4:
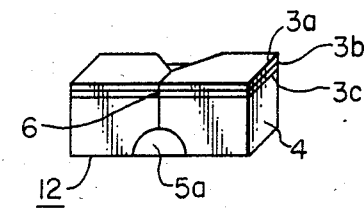
FIG. 4 is a perspective view of a part of another embodiment of the invention.

In the case where the magnetic head requires satisfactory electro-magnetic conversion characteristics at frequencies of about 10 MHz or more to further improve its performance, as shown in FIG. 4, a sputtered ceramic or glass layer 3b interposed between the two adjoining layers 3a and 3c of a multilayered soft magnetic alloy for insulation appears effective for this purpose. The present invention is therefore equally applicable to extremely high frequency ranges.

Whereas in the foregoing the use of ferrite as soft magnetic material in the back core has been discussed and illustrated, the present invention should not be limited thereto. In addition, though the ceramic material is used as the wear-proof material, other materials such as glass are also available.

Further the front core may be of the same size as the back core, though in FIG. 3 the front core is present only on the front part of the back core.

The following are specific examples of the present invention.

EXAMPLE 1

After a vacuum vessel was evacuated to $3\times10^{-7}$ Torr and Ar gas was injected to obtain a pressure of $1\times10^{-2}$ Torr, sendust and amorphous magnetic alloy $Co_{86}Nb_{14}$ were deposited to a thickness of 6 μm on a variety of mirror-finished ceramic and glass substrates by sputtering. Through the above described procedure magnetic heads were manufactured. The shape of the front of the resulting heads was 300 μm×2 mm. For comparison with the magnetic head constructed according to the present invention, a single crystal Mn-Zn ferrite head of a similar configuration with 300 μm of track width and 2 mm of width was prepared. Wear resistance tests were conducted for comparison by running a tape of Co-doped $\gamma$-$Fe_2O_3$ over the various heads installed in a VTR deck available on the market for 500 hours. The surface of the single crystal Mn-Zn ferrite head on which the tape ran was the (2,1,1) plane. The results of such tests are shown in Table 1.

TABLE 1

| Head Structure | | Amount of Wear after 500 hr running |
| --- | --- | --- |
| Prior Art: Ferrite (2,1,1) plane | | 10 μm |
| Embodiment of the Invention: | | |
| Substrate: | Soft-magnetic film | |
| Forsterite | sendust | 6 μm |
| Barium titanate | sendust | 6 μm |
| Alumina titanium carbide | sendust | 4 μm |
| Forsterite | $Co_{86}Nb_{14}$ amorphous alloy | 6 μm |
| Barium titanate | $Co_{86}Nb_{14}$ amorphous alloy | 6 μm |
| Alumina titanium carbide | $Co_{86}Nb_{14}$ amorphous alloy | 4 μm |
| Glass | $Co_{86}Nb_{14}$ amorphous alloy | 8 μm |

The test results in the above table prove superiority of the magnetic head according to the present invention over the ferrite head with respect to abrasion resistance.

EXAMPLE 2

After the vacuum vessel was evacuated to $3\times10^{-7}$ Torr and an Ar gas was introduced to assure a pressure of $1\times10^{-2}$ Torr, sendust was sputtered to a thickness of 6 μm on a mirror-finished forsterite substrate, then $Al_2O_3$ was sputtered thereon to a thickness of 0.1 μm and a layer of sendust of 6 μm of thickness was further deposited thereon by sputtering. A front core with 30.4 μm of track width similar to that shown in FIG. 1B was eventually made by repetition of the above sputtering procedure (Sample A). Another example of a front core including amorphous alloy $Co_{86}Nb_{14}$ instead of sendust insulated by $SiO_2$ interposed-films was also prepared in a similar manner (Sample B). A back core of a composite of forsterite and ferrite (Mn-Zn sintered ferrite) whose configuration is shown in FIG. 1A was adhered to these examples of the front core to complete a VTR head as shown in FIG. 3.

Characteristic comparison was conducted between the resulting magnetic heads according to the present invention and a counterpart which used single crystal Mn-Zn ferrite having (2,1,1) plane at its tape-sliding surface and substantially the same track width as specified above (Prior Art). A metal tape whose coercive force amounted to 1100 Oe was used as a characteristic evaluation tape. The relative sensitivity of the heads of the present invention for recording and reproducing 8 MHz reference signals was as shown below where the sensitivity of the single crystal Mn-Zn ferrite head was 0 dB.

The results of characteristic measurements and various factors of magnetic head front core materials used are enumerated in Table 2.

TABLE 2

| | Head Structure | | |
| --- | --- | --- | --- |
| | Prior Art | Sample A | Sample B |
| Front core | | | |
| Bs | 4000 | 9000 | 8500 |
| Hc | 0.05 | 0.03 | 0.07 |
| permeability | | | |
| 1 MHz | 5000 | 4000 | 2000 |
| 5 MHz | 700 | 2000 | 2000 |
| 10 MHz | 300 | 1000 | 1500 |
| Recording Reproducing sensitivity | 0dB | +3dB | +4dB |
| Amount of wear after 500 hours of use | 10 μm | 6 μm | 6 μm |

Prior Art
Mn—Zn single crystal ferrite, (2,1,1) plane
Sample A
Front core: Sendust
Back core: Mn—Zn sintered Ferrite
Sample B
Front core: Amorphous $Co_{86}Nb_{14}$
Back core: Mn—Zn sintered ferrite

What is claimed is:

1. A magnetic head comprising:
    a front core having a wear-resistant non-magnetic base and a soft magnetic thin film on said base, said thin film being in two parts and having a magnetic gap therebetween;
    a back core having a U-shaped block of soft magnetic material having magnetic characteristics inferior to those of said thin film and wear resistance characteristics superior to those of said thin film, and a wear-resistant non-magnetic member mounted between the ends of the leg portions of said block, said front core being against the lateral face of said back core adjacent the ends of said legs and having said thin film sandwiched between said back core and said non-magnetic base, the ends of said legs, said non-magnetic member, the edge of said thin film and the side face of said non-magnetic base forming a tape contact face, said magnetic gap facing said wear-resistant non-magnetic member on said back core, said soft magnetic thin film and said soft magnetic block being in face-to-face contact with each other out of the neighborhood of said magnetic gap for forming a closed magnetic path across said magnetic gap; and
    a winding on said block.

2. A magnetic head as claimed in claim 1, wherein soft magnetic thin film comprises Sendust or amorphous alloy.

3. A magnetic head as claimed in claim 1, wherein said soft-magnetic thin film is a multi-layer film comprising soft magnetic layers and an insulator layer or layers.

4. A magnetic head as claimed in claim 3, wherein said insulator layer is a wear-resistive material.

5. A magnetic head as claimed in claim 4, wherein said insulator layer comprises a ceramic or glass.

6. A magnetic head as claimed in claim 3, wherein said insulator layer is thinner than said soft magnetic layer.

7. A magnetic head as claimed in claim 1, wherein said wear-resistant non-magnetic base comprises a ceramic or glass.

8. A magnetic head as claimed in claim 1, wherein said U-shaped block comprises a ferrite.

9. A magnetic head as claimed in claim 1, wherein said wear-resistant non-magnetic member of said back core comprises a ceramic or glass.

* * * * *